United States Patent [19]

Goosen

[11] Patent Number: 4,932,769
[45] Date of Patent: Jun. 12, 1990

[54] ADJUSTABLE AUXILIARY PLANAR REAR VIEW MIRROR

[76] Inventor: Carl C. Goosen, 1604 Eagle Nest Cir., Winter Springs, Fla. 32708

[21] Appl. No.: 446,064

[22] Filed: Dec. 5, 1989

[51] Int. Cl.$^5$ .............................................. G02B 5/08
[52] U.S. Cl. .................................... 350/626; 350/631
[58] Field of Search ............... 350/631, 632, 636, 624, 350/625, 626

[56] References Cited

U.S. PATENT DOCUMENTS

| | | | |
|---|---|---|---|
| 4,303,308 | 12/1981 | Kobrin | 350/625 |
| 4,311,363 | 1/1982 | Marsalka et al. | 350/625 |
| 4,526,446 | 7/1985 | Adams | 350/626 |
| 4,629,296 | 12/1986 | White | 350/626 |

Primary Examiner—Bruce Y. Arnold
Assistant Examiner—Jay Ryan
Attorney, Agent, or Firm—Arthur W. Fisher, III

[57] ABSTRACT

An adjustable auxiliary planar rear view mirror for use in combination with a primary outside rear view mirror to increase the driver's field of vision comprising an outer mirror mounting member including an inclined retainer and an intermediate coupling member including an inclined support to operatively support a planar reflective element therebetween at an angle of substantially ten degrees relative to the central axis or the adjustable auxiliary planar rear view mirror mounting member, and an inner attachment member to rotatably mount the planar reflective element on the primary outside rear view mirror.

17 Claims, 3 Drawing Sheets

ADJUSTABLE AUXILIARY PLANAR REAR VIEW MIRROR

BACKGROUND OF THE INVENTION

1. Field of the Invention

An adjustable auxiliary substantially planar rear view mirror for use in combination with a larger outside rear view mirror to increase or expand the driver's field of vision and reduce distance distortion.

2. Description of the Prior Art

Convex mirrors are often used in combination with a substantially planar for outside rear view mirrors.

Various limitations are associated with positioning and focusing of such convex mirrors. For example, a particular vehicle driver may prefer different orientations of the convex rear view mirror when operated in city traffic or highway traffic and at night or during in the day. Moreover, different orientations may be preferred for operating the vehicle in forward and reverse directions. Further, different drivers commonly prefer to change the position of the convex rear view mirror.

Another problem with conventional convex rear view mirrors is the method of attachment of the convex mirror to the planar mirror surface. If the convex mirror is mounted in the wrong position, or if it is later desired to move the mirror to a new position, there may be very little that can be easily done about it. Although the planar mirror may be adjustable, the desired orientation of the convex mirror relative to the planar mirror may change as the driving conditions, and/or driver vary.

U.S. Pat. No. 4,303,308 discloses a rear view mirror having a planar mirror and a convex mirror disposed in angular relationship relative thereto.

U.S. Pat. No. 4,311,363 teaches an auxiliary mirror attachment to mount on a primary mirror to support an optical reflecting element. The support housing includes an integrally formed base plate and a peripheral wall projecting laterally from the base plate. Attachment of the unit to a primary mirror is accomplished by an adhesive.

U.S. Pat. No. 3,826,563 discloses a mirror assembly mounted on the vehicle as a side view mirror. The mirror assembly comprises an upper and lower flat mirror supported in essentially vertical planes and inclined relative to one another such that when the assembly is attached to the motor vehicle, the two mirrors provide separate reflected fields for increased vision.

U.S. Pat. No. 3,408,136 shows a rear view mirror including an elongated shell to support a rectangular convex mirror and a flat mirror.

U.S. Pat. No. 4,629,296 teaches a selectively adjustable convex mirror to provide alternative rear views comprising a cylindrical housing and a circular convex mirror positioned in the housing. The housing is rotatably mounted on a swivel mechanism. The mirror is mounted in the housing in such a manner that rotation of the housing upon the swivel mechanism moves the convex mirror through a plurality of reflective orientations. A locking and indexing mechanism is provided to retain the housing in a selected position relative to the swivel mechanism and to provide controlled and incremental rotation of the housing about the swivel mechanism. The entire assembly is secured to a planar mirror surface of an outside rearview mirror of a motor vehicle.

U.S. Pat. No. 4,526,446 discloses an auxiliary convex rear view mirror mounted on a larger flat rear view mirror. The auxilary mirror has a wedge-shaped base and adjusting ring retaining a convex mirror and rotatably adjustable on the base about an axis extending oblique to the larger flat mirror. The convex mirror is spherical about an axis extending at an acute angle to the rotational axis of the adjusting ring.

SUMMARY OF THE INVENTION

The present invention relates to an adjustable auxiliary planar rear view mirror for use in combination with a primary outside rear view mirror to increase the driver's field of vision. Numerous auxiliary mirrors have been developed. Unfortunately, such auxiliary mirrors commonly use convexity to expand the field of vision which distorts the distance perception.

The instant invention employs a planar reflective element that when properly placed on an existing outside rear view mirror provides uninterrupted vision until the adjacent vehicle enters the driver's peripheral field of vision effectively eliminating the driver's blind spot.

Specifically, the adjustable auxiliary planar rear view mirror comprises an outer mirror mounting member including an inclined retainer and an intermediate coupling member including an inclined support to operatively support a planar reflective element therebetween and an inner attachment member to rotatably mount the planar reflective element on the primary outside rear view mirror.

The outer mirror mounting member comprises a wedge-shaped outer cylindrical side wall having the inclined retainer extending inwardly from the upper portion thereof; while, the intermediate mirror mounting member comprises a wedge-shaped intermediate cylindrical side wall having the inclined support formed on the upper portion thereof and a circular intermediate base formed on the lower portion thereof. The intermediate mirror mounting member is disposed within the outer mirror mounting member such that the planar reflective element is secured between the inclined retainer and inclined support at an angle of substantially ten (10%) degrees relative to the central axis of the adjustable auxiliary planar rear view mirror. A coupling element is formed on the circular intermediate base of the intermediate coupling member to rotatable couple the outer mirror mounting member and the intermediate coupling member to the inner attachment member.

The inner attachment member comprises an inner cylindrical side wall and a circular inner base having an centrally disposed aperture formed therein to receive the coupling element. A pressure sensitive adhesive element is affixed to the outer or bottom surface of the circular inner base.

To install, the covering is peeled from the pressure sensitive adhesive element. The adjustable auxiliary planar rear view mirror is then placed the primary outside rear view mirror on the upper right corner thereof. The thin edge of the wedge should be on the side away from the driver. The adjustable auxiliary planar rear view mirror is then pressed on to the primary outside rear view mirror.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
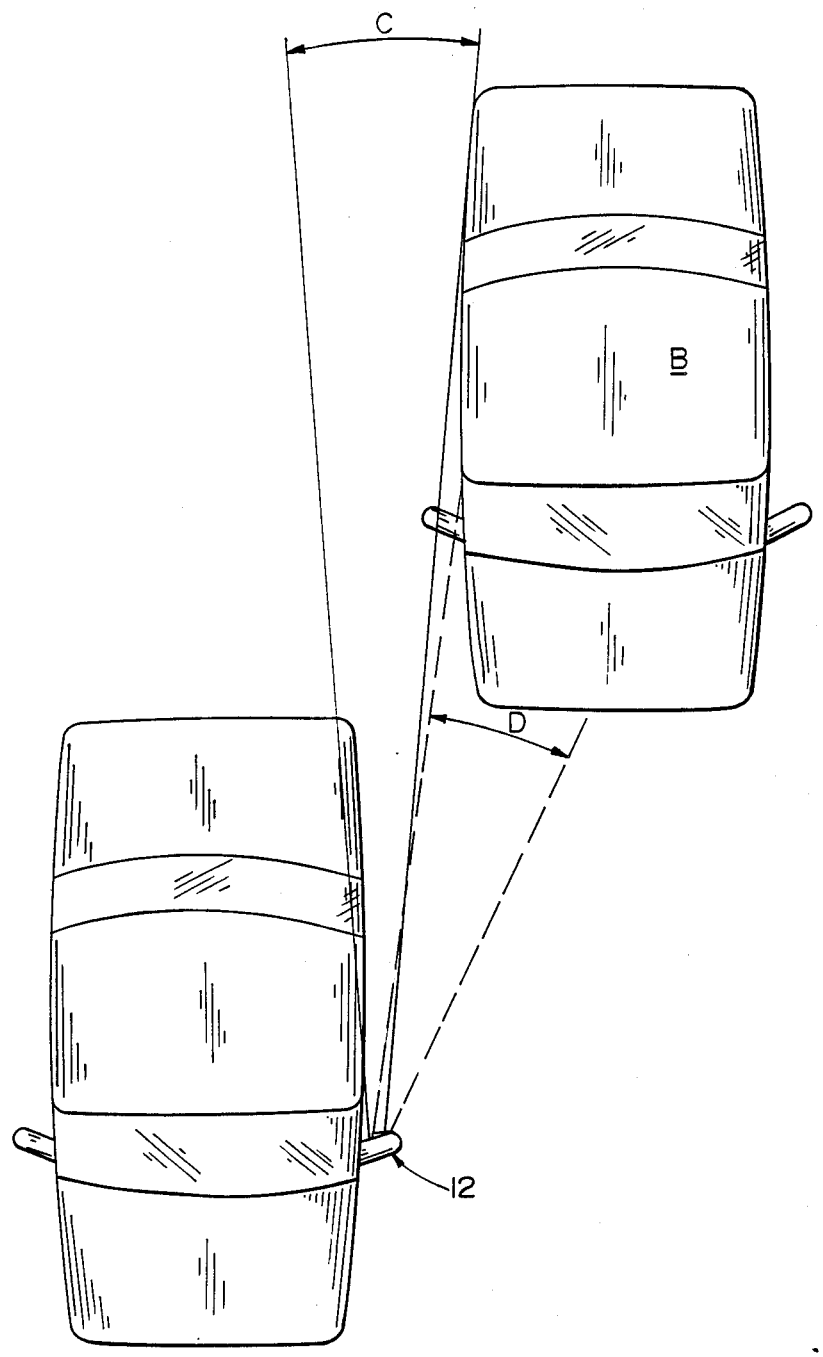
FIG. 1 is a top schematic view of the field of vision of the adjustable auxiliary planar rear view mirror in combination with a primary outside rear view mirror.
Figure 4:
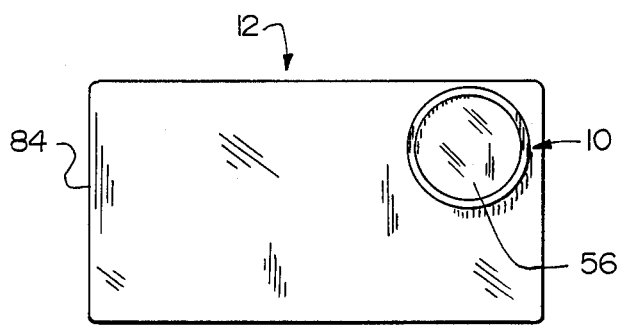
FIG. 4 is a front view of the adjustable auxiliary planar rear view mirror mounted on the primary outside rear view mirror.

As shown in FIGS. 1 and 4, the present invention relates to an adjustable auxiliary planar rear view mirror generally indicated as 10 for use in combination with a primary outside rear view mirror generally indicated as 12 to increase the driver's field of vision and effectively eliminate the blind spot on the driver's side.

It should be noted that the primary outside rear view mirror provides a more or less stationary image; while, the adjustable auxiliary planar rear view provides mirror a rapidly moving image.

Figure 2:
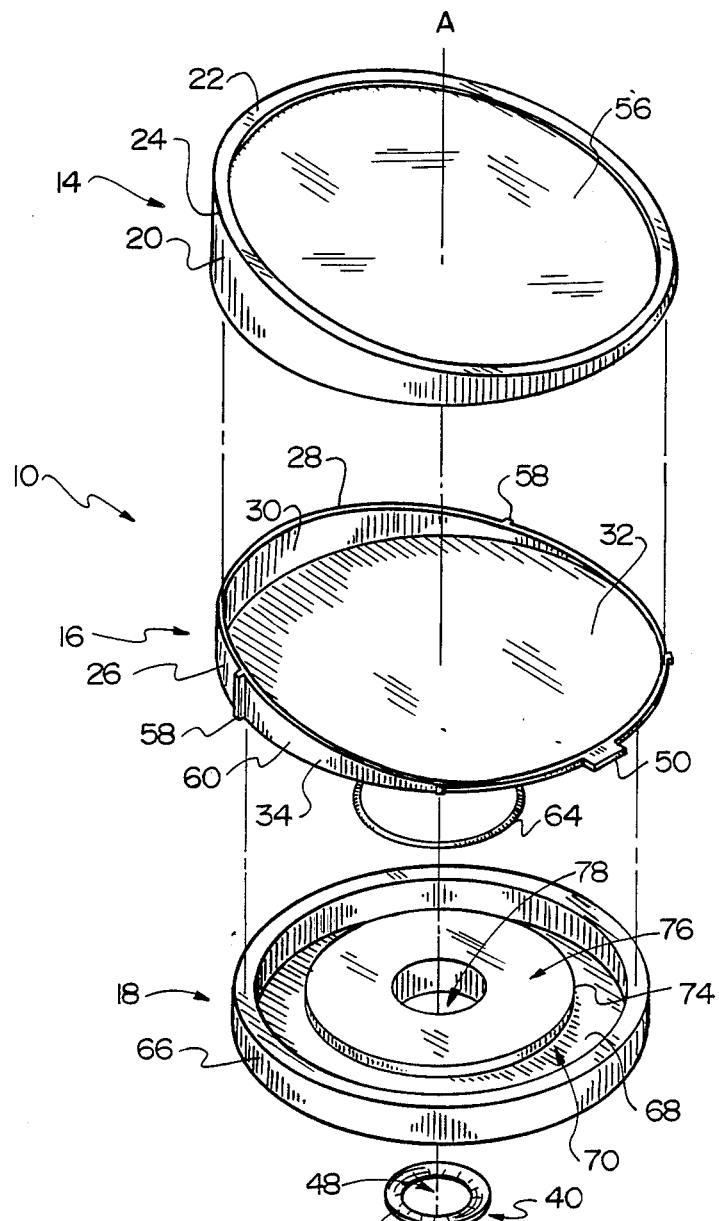
FIG. 2 is an exploded perspective view of the adjustable auxiliary planar rear view mirror.
Figure 3:
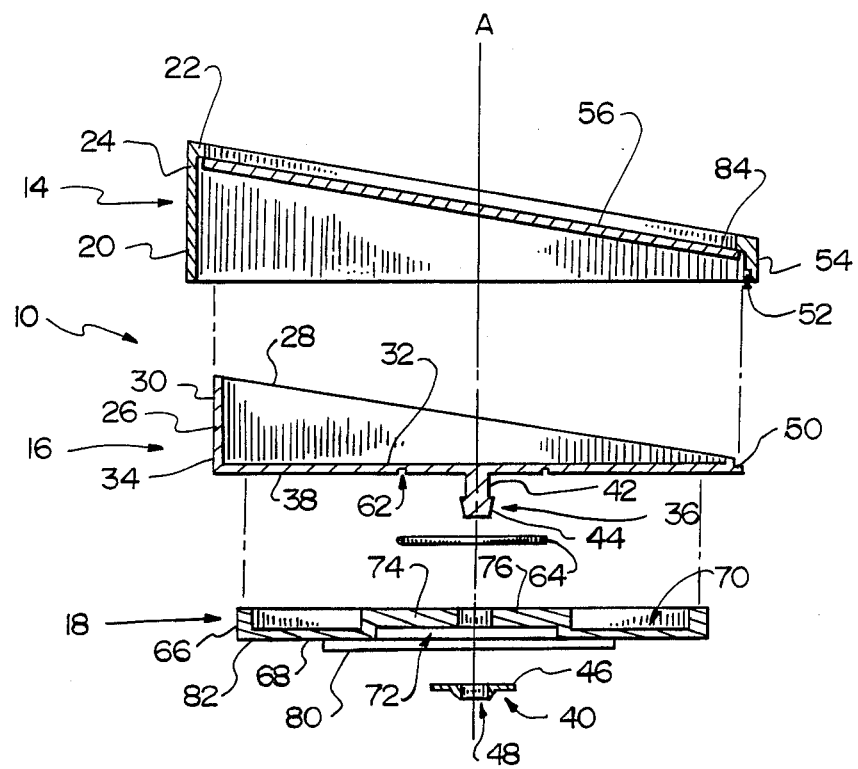
FIG. 3 is an exploded side view of the adjustable auxilary planar rear view mirror.

As best shown in FIGS. 2 and 3, the adjustable auxiliary planar rear view mirror 10 comprises an outer mirror mounting member, intermediate coupling member and inner attachment member generally indicated as 14, 16 and 18 respectively.

The outer mirror mounting member 14 comprises a wedge-shaped outer cylindrical side wall 20 having an inclined retainer ridge or lip 22 extending inwardly from the upper periphery 24 thereof. The plane of the inclined retainer ridge or lip 22 forms an angle of substantially ten (10%) degrees relative to the center line A of the adjustable auxiliary planar rear view mirror 10.

The intermediate mirror mounting member 16 comprises a wedge-shaped intermediate cylindrical side wall 26 having an inclined support ledge 28 formed on the upper portion 30 thereof and a circular base 32 formed on the lower portion 34 thereof. The plane of the inclined support ledge 28 forms an angle of substantially ten (10%) degrees relative to the center line A of the adjustable auxiliary planar rear view mirror 10.

As shown in FIG. 3, a coupling member generally indicated as 36 is formed on the lower surface 38 of the circular base 32 to engage a fastener generally indicated as 40 to rotatably couple the intermediate mirror mounting member 16 to the inner attachment member 18. Specifically, the coupling member 36 comprises a cylindrical reduced inner post 42 and an enlarged outer element 44; while, the fastener 40 comprises a ring 46 having a centrally disposed fastener aperture 48 formed therein to receive the cylindrical reduced inner post 42 therethrough.

As best shown in FIG. 3, the diameter of the intermediate coupling member 16 is less than the diameter of the outer mirror mounting member 14 such that the intermediate coupling member 16 is disposed therein when assembled. An alignment means comprising a key 50 and a key-way or notch 52 formed on the periphery of the circular base 32 and the lower portion 54 of the wedge-shaped outer cylindrical side wall 20 respectively is provided to operatively align the outer mirror mounting member 14 and the intermediate coupling member 16 such that corresponding points of the inclined ridge or lip 22 and the inclined support ledge 28 are vertically aligned relative to each other to retain a circular reflective element 56 therebetween at an angle of substantially ten (10%) degrees relative to the center line A.

As shown in FIG. 2, a plurality of vertically disposed ribs each indicated as 58 are formed on the outside surface 60 of the wedge-shaped intermediate cylindrical side wall 26 to hold the wedge-shaped intermediate cylindrical side wall 26 in substantially parallel spaced relationship relative to the wedge-shaped outer cylindrical side wall 20.

As best shown in FIG. 3, a sealing recess 62 is formed on the lower surface 38 of the circular base 32 to partially receive a seal 64 therein to seal the intermediate coupling member 16 and inner attachment member 18.

As best shown in FIGS. 2 and 3, the inner attachment member comprises an inner cylindrical side wall 66 and a circular inner base 68 having an inner recess 70 and an outer recess 72 formed therein and a centrally disposed post 74 including a sealing surface 76. A centrally disposed aperture 78 is formed on the centrally disposed post 74 to receive a cylindrical reduced inner post 42 therethrough. In addition, a pressure sensitive adhesive element 80 is affixed to the lower or outer surface 82 of the circular inner base 68.

To assemble, the circular reflective element 56 is placed between the inner surface 84 of the inclined retainer ridge or lip 22 of the outer mirror mounting member 14 and the inclined support ledge 28 of the intermediate mirror mounting member 16 aligning the key 50 with the key-way or notch 52 to properly orient the outer mirror mounting member 14 and intermediate coupling member 16 relative to each other. The seal 64 is then placed in the sealing recess 62. The inner attachment member 18 is mounted on the intermediate coupling member 16 with the enlarged outer element 44 passing through the centrally disposed aperture 78 to receive the fastener 40 to rotatably secure the inner attachment member 18 to the intermediate coupling member 16 with the fastener 40 and enlarged outer element 44 disposed within the outer recess 72. The pressure sensitive adhesive element 80 is then affixed to the lower outer surface 82 of the inner attachment member 18.

To install, the covering is peeled from the pressure sensitive adhesive element 80. The adjustable auxiliary planar rear view mirror 10 is then placed on the primary outside rear view mirror 12 on the upper right corner thereof. The thin edge of the wedge should be on the side away from the driver. The adjustable auxiliary planar rear view mirror 10 is then pressed onto the primary outside rear view mirror 12 and rotated to adjust for a full view between 180 degrees and 270 degrees. Specifically, as shown in FIG. 1, the driver initially views the adjacent vehicle B through arc C in the reflective element 84 of the primary outside rear view mirror 12. As the adjacent vehicle B approaches the rear of the driver's car, the driver the views the adjacent vehicle B through arc D in the planar reflective element 56 until entering the driver's peripheral vision.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An adjustable auxiliary planar rear view mirror for use in combination with a primary outside rear view mirror to increase the driver's field of vision through an arc of at least 90 degrees, said adjustable auxiliary planar rear view mirror comprises an outer mirror mounting member including an inclined retainer and an intermediate coupling member including an inclined support to operatively support a planar reflective element therebetween and an inner attachment member to rotatably couple said planar reflective element on the primary outside rear view mirror, said outer mirror mounting member comprising a wedge-shaped outer cylindrical side wall having an inclined retainer lip extending inwardly from the upper periphery thereof, said intermediate mirror mounting member comprising a wedge-shaped intermediate cylindrical side wall having an inclined support ledge formed on the upper portion thereof and a circular base formed on the lower portion thereof and said inner attachment member comprising an inner side wall and an inner base having a centrally disposed aperture to receive a coupling member formed on said circular base to engage a fastener to rotatably couple said intermediate mirror mounting member to said inner attachment member.

2. The adjustable auxiliary planar rear view mirror of claim 1 wherein said coupling member comprises a reduced inner post and an enlarged outer element and said fastener comprises a ring having a centrally disposed fastener aperture formed therein to receive said reduced inner post therethrough.

3. The adjustable auxiliary planar rear view mirror of claim 2 wherein said inner base includes an outer recess formed therein to operatively house said enlarged outer element and said ring.

4. The adjustable auxiliary planar rear view mirror of claim 1 further including an alignment means to operatively align said wedge-shaped outer cylindrical side wall relative to said wedge-shaped intermediate side wall, said alignment means comprises a key and a key-way formed on the periphery of said circular base and the lower portion of said wedge-shaped outer cylindrical side wall respectively such that corresponding points of said inclined ridge and said inclined support ledge are vertically aligned relative to each other to retain said circular reflective element therebetween at an angle of substantially ten (10%) degrees relative to the center line of said adjustable auxiliary planar rear view mirror.

5. The adjustable auxiliary planar rear view mirror of claim 4 further including a plurality of vertically disposed ribs formed on the outside surface of said wedge-shaped intermediate cylindrical side wall to hold said wedge-shaped intermediate cylindrical side wall in substantially parallel spaced relationship relative to said wedge-shaped outer cylindrical side wall.

6. The adjustable auxiliary planar rear view mirror of claim 4 further including a sealing recess formed on the lower surface of said circular base to partially receive a seal therein to seal said intermediate coupling member and said inner attachment member.

7. The adjustable auxiliary planar rear view mirror of claim 6 wherein said inner attachment member comprises an inner cylindrical side wall and a circular inner base having an inner recess and said outer recess formed on opposite sides thereof and a centrally disposed post including a sealing surface, said centrally disposed aperture formed on said centrally disposed post to receive said reduced inner post therethrough.

8. The adjustable auxiliary planar rear view mirror of claim 7 further including a pressure sensitive adhesive element affixed to the lower surface of said circular inner base.

9. An adjustable auxiliary planar rear view mirror for use in combination with a primary outside rear view mirror to increase the driver's field of vision through an arc of at least 90 degrees, said adjustable auxiliary planar rear view mirror comprises an outer mirror mounting member including an inclined retainer and an intermediate coupling member including an inclined support to operatively support a planar reflective element therebetween and an inner attachment member to rotatably couple said planar reflective element on the primary outside rear view mirror, and further including an alignment means to operatively align said outer mirror mounting member relative to said intermediate coupling member, said alignment means comprises a key and a key-way formed said outer mirror mounting member and said intermediate coupling member respectively such that corresponding points of said inclined retainer and said inclined support are vertically aligned relative to each other to retain said planar reflective element therebetween at an angle of substantially ten (10%) degrees relative to the center line of said adjustable auxiliary planar rear view mirror.

10. The adjustable auxiliary planar rear view mirror of claim 9 wherein said outer mirror mounting member comprises a wedge-shaped outer cylindrical side wall having an inclined retainer lip extending inwardly from the upper periphery thereof and said intermediate mirror mounting member comprises a wedge-shaped intermediate cylindrical side wall having an inclined support ledge formed on the upper portion thereof and a circular base formed on the lower portion thereof.

11. The adjustable auxiliary planar rear view mirror of claim 10 wherein said inner attachment member comprises an inner side wall and an inner base having a centrally disposed aperture to receive a coupling member formed on said circular base to engage a fastener to rotatably couple said intermediate mirror mounting member to said inner attachment member.

12. The adjustable auxiliary planar rear view mirror of claim 11 wherein said coupling member comprises a reduced inner post and an enlarged outer element and said fastener comprises a ring having a centrally disposed fastener aperture formed therein to receive said reduced inner post therethrough.

13. The adjustable auxiliary planar rear view mirror of claim 12 wherein said inner base includes an outer recess formed therein to operatively house said enlarged outer element and said ring.

14. The adjustable auxiliary planar rear view mirror of claim 10 further including a plurality of vertically disposed ribs formed on the outside surface of said wedge-shaped intermediate cylindrical side wall to hold said wedge-shaped intermediate cylindrical side wall in substantially parallel spaced relationship relative to said wedge-shaped outer cylindrical side wall.

15. The adjustable auxiliary planar rear view mirror of claim 14 further including a sealing recess formed on the lower surface of said circular base to partially receive a seal therein to seal said intermediate coupling member and said inner attachment member.

16. The adjustable auxiliary planar rear view mirror of claim 15 wherein said inner attachment member comprises an inner cylindrical side wall and a circular inner base having an inner recess and said outer recess formed on opposite sides thereof and a centrally disposed post including a sealing surface, said centrally disposed aperture formed on said centrally disposed post to receive said reduced inner post therethrough.

17. The adjustable auxiliary planar rear view mirror of claim 16 further including a pressure sensitive adhesive element affixed to the lower surface of said circular inner base.

* * * * *